(12) United States Patent
Smyth (10) Patent No.: US 11,460,138 B1
(45) Date of Patent: Oct. 4, 2022

(54) PIPE SLEEVE HEATER

(71) Applicant: Petrosleeve Incorporated, Nisku (CA)

(72) Inventor: Robert James Smyth, Calgary (CA)

(73) Assignee: PETROSLEEVE INCORPORATED, Nisku (CA)

(*) Notice: Subject to any disclaimer, the term of this patent is extended or adjusted under 35 U.S.C. 154(b) by 329 days.

(21) Appl. No.: 16/898,314

(22) Filed: Jun. 10, 2020

(51) Int. Cl.
| F16L 53/30 | (2018.01) |
| F23D 14/56 | (2006.01) |
| F23D 14/70 | (2006.01) |
| F16L 55/18 | (2006.01) |

(52) U.S. Cl.
CPC .............. *F16L 53/30* (2018.01); *F16L 55/18* (2013.01); *F23D 14/56* (2013.01); *F23D 14/70* (2013.01)

(58) Field of Classification Search
CPC .......... F16L 53/30; F23D 14/54; F23D 14/56; F23D 14/58; F23D 14/70; F23D 14/84; F23D 2900/11401; B29C 35/045
USPC ........................................................ 432/225
See application file for complete search history.

(56) References Cited

U.S. PATENT DOCUMENTS

| 4,039,279 | A | * | 8/1977 | Horeczko | ..................... 432/225 |
| 4,780,158 | A | * | 10/1988 | Thomas | |
| 5,073,108 | A | * | 12/1991 | Kirby | ..................... F16L 53/30 |
| | | | | | 432/225 |
| 5,205,732 | A | * | 4/1993 | Kirby | ..................... F16L 55/18 |
| | | | | | 432/225 |
| 9,080,701 | B2 | * | 7/2015 | George | |

* cited by examiner

*Primary Examiner* — Zachary T Dragicevich
(74) *Attorney, Agent, or Firm* — Thomas E. Malyszko (57) ABSTRACT

A heater of an external tubular sleeve for repairing a longitudinal section of defective hollow pipe has a frame for encompassing the sleeve when operationally positioned. Each of several burners spaced at intervals about the frame as nozzle for heating the sleeve, and a novel baffle located intermediate the nozzle and sleeve when operationally positioned, for heat dispersal over the sleeve. Each baffle has staggered vents for passing flame from the nozzle onto the sleeve, to avoid cold spots on the sleeve below the baffle, and has a central shaped deflector proximate the vents and facing the nozzle. Flame from the nozzle impacts the deflector and redirects toward the vents and periphery, of the baffle, to avoid point heating below the nozzle and provide diffused flame uniformly over the sleeve. Changing deflector and vent features can influence desired flame dispersal characteristics.

16 Claims, 8 Drawing Sheets

PIPE SLEEVE HEATER

FIELD OF THE INVENTION

The present invention relates to a heating apparatus for pipe reinforcement, and in particular relates to an apparatus for improved heating of an external sleeve arrangement for repairing deficient hollow pipes, such as those transporting fluids under pressure in the petroleum industry.

BACKGROUND OF THE INVENTION

Pipes for transporting fluids, particularly those used in the oil and gas industry, can suffer deficiencies such as corrosion, mill defects, stress corrosion cracking, and hydrogen induced cracking. Known methods of dealing with such defective pipes are described in the background of applicant's U.S. Pat. Nos. 5,722,463 and 9,982,829, and in Canadian patents 2,164,011 and 2,891,701.

Applicant's preferred method employs external sleeves for repairing unperforated pipes that transport fluids under pressure, including certain corroded or cracked pipes. These sleeves are useful in providing desired compressive forces onto the underlying pipe, particularly onto larger diameter pipes (30 in./76 cm or more), and are equally effective on smaller diameter pipes (under 30 in./76 cm). The compressive forces are primarily created by heating and subsequently cooling these sleeves, when mounted on the pipe being repaired. Applicant's sleeves are not welded to the pipe, thus avoiding numerous occupational hazards, potential metallurgical failures, and costly expenditures, and are also capable of installation whether the pipe is pressurized (ie. operating) or not. When installed while the pipe is pressurized, applicant's sleeves and repair methods avoid pipe system shut downs and disruption of throughput of product in the pipe, and unlike the prior art do not loosen and separate from the pipe if the operating pressure later drops.

There are several important steps for realizing a successful sleeve installation, one of which is the aforementioned heating of the sleeve. The goal is to obtain a certain temperature profile between sleeve and pipe to achieve adequate differential expansion of the sleeve relative to the pipe, resulting in sufficient compressive forces of the sleeve on the pipe to effect a good repair upon cooling of the sleeve. This requires rapid heating of the entire sleeve while avoiding or delaying as much as possible heating of the underlying pipe. Proper application of heat is of particular importance when employing applicant's proprietary "thick sleeves" (i.e. a sleeve thicker than the pipe wall), and in any event has become more tricky over time as pipe thicknesses have decreased due to greater use of higher strength steels.

Prior art heating methods are lacking to meet current requirements. One such method has been for multiple workers to crowd around a clamped sleeve and wave hand-held propane torches over its surface, but this is neither efficient or safe, nor is the heating sufficiently quick or uniform. Another method has been to fix several torches over different locations of a sleeve and fire them simultaneously, which unfortunately results in unacceptable differential heating where "point heating" of those areas of the sleeve directly impacted by flame expand rapidly, while all other areas receiving less heat expand too slowly. Attempts to address point heating by placing solid plates in flame paths has resulted in the reverse problem, where "cold spots" develop on portions of the sleeve under the plates, and heat dispersal beyond the plates leads to inadequate heating of the sleeve and unwanted heat penetration to the underlying pipe, frustrating efforts to achieve the desired temperature differential between sleeve and pipe.

What is therefore desired is a novel pipe sleeve heater which overcomes the limitations and disadvantages of the existing heating methods and tools. Preferably, it should provide for improved heat dispersal over a larger area of a sleeve's surface, and a greater rate of uniform heating than prior art methods, while minimizing or avoiding point heating and cold spot problems. Such improved heat transfer should allow for use of relatively smaller burner nozzles, and more efficient use of propane than previous arrangements. In particular, the heater should provide heating to substantially the entire surface of the sleeve simultaneously, without the need to manually move or manipulate any of the heating sources over the sleeve surface by hand or otherwise. The heater should further allow workers access to specific areas of the sleeve, to attend to urgent tasks such as welding of joiner bars, immediately upon completion of heating, without having to first remove any heating apparatus from the sleeve. However, the heater should also be capable of easy and rapid removal from a sleeve when desired, such as upon completion of heating or sleeve installation. Optionally, the heater should advantageously be capable of employing a module for secure storage of pipe repair equipment, and for reducing risk of damage to the heater during storage and transport.

SUMMARY OF THE INVENTION

According to the present invention, there is provided in a preferred aspect an apparatus to heat a tubular shaped repair sleeve mounted on a longitudinal section of defective hollow pipe comprising a frame adapted to fit onto said sleeve and be closed into an operational position circumferentially encompassing said sleeve, and a plurality of burners on said frame at intervals circumferentially thereabout when in said operational position, each burner having:

a heating nozzle spaced radially from said sleeve when in said operational position; and, a baffle located intermediate said heating nozzle and said sleeve when in said operational position, each baffle defined by a plate having:

a vent arrangement spaced away from a given point on said baffle plate and extending thereabout to allow flame from said heating nozzle to travel through said vent arrangement into contact with said sleeve; and, a deflector proximate said given point intermediate said vent arrangement and facing said heating nozzle for impacting and redirecting said flame therefrom toward said vent arrangement and periphery of said baffle plate, thereby providing substantially diffused flame for enhanced heating of said sleeve about each burner when in said operational position.

BRIEF DESCRIPTION OF THE DRAWING FIGURES

Embodiments of the invention will now be described, by way of example only, with reference to the accompanying drawings, wherein.

DETAILED DESCRIPTION OF THE INVENTION

The figures show an apparatus according to a preferred embodiment of the present invention, referred to herein as a "pipe sleeve heater" or "heater", generally designated by reference numeral 40, for heating a sleeve 30 adapted to repair a longitudinal section of defective hollow pipe 20. For illustrative purposes the pipe 20 is of the type that transports fluids under pressure in the petroleum industry, including more current "thinner" walled pipes made of high strength steel for carrying fluids under higher internal pressures; and, the sleeve 30 is of the type described in applicant's U.S. Pat. No. 5,722,463 and Canadian patent 2,164,011, including applicant's proprietary "thick sleeve" described in applicant's U.S. Pat. No. 9,982,829 and Canadian patent 2,891,701. Also, several figures show the heater 40 mounted onto a horizontally oriented pipe 20, and so for ease of reference certain features of the sleeve 30 and heater 40 may be described as being located on top of the pipe, for example. Since sections of defective pipe in operating pipelines may be found at any inclination, including vertical, it should be appreciated that terms as "top" or "below", "upper" or "lower" and the like are words of convenience used for identifying certain features relative to the pipe illustrated in the figures. The use of these terms is not intended to limit the heater's use or orientation. Further, when describing the invention, all terms not defined herein have their common art-recognized meaning.

Figure 1:
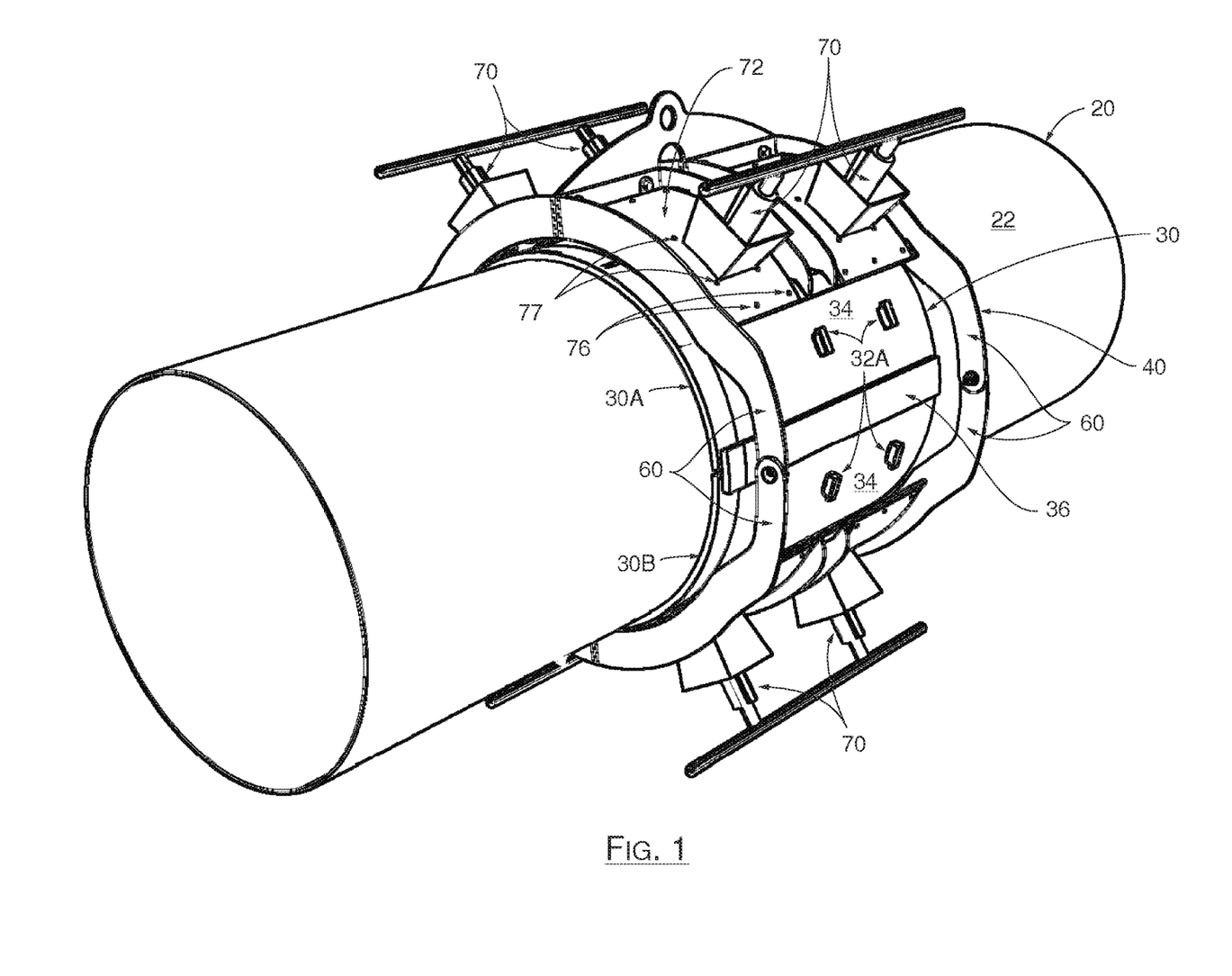
FIG. 1 is a perspective view of a pipe sleeve heater according to a preferred embodiment of the present invention showing the heater in a closed configuration operationally positioned over a tubular repair sleeve mounted on a longitudinal section of defective hollow pipe requiring repair.

Referring first to FIG. 1, it illustrates a preferred embodiment of the heater 40 operationally positioned, or fitted or mounted, onto the sleeve 30, meaning the heater is set up to apply heat to the sleeve which itself has already been positioned and closed or clamped over a defective section of the pipe 20 requiring repair. A preferred method of clamping is to squeeze the top and bottom sleeve segments 30a, 30b onto the pipe's outer surface 22 with screw jacks or like clamps (not shown) which engage lug nuts 32a, fixed to the outer surfaces 34 of sleeve segments 30a, 30b, for drawing/squeezing the sleeve segments together to place them in tension. A binding agent (not shown) is typically placed between the pipe's outer surface 22 and each sleeve segment. Once the sleeve segments 30a, 30b have been heated and thermally expanded as desired, the sleeve segments are permanently joined at their interfaces by welding connector plates 36 thereto, before removing the screw jacks and allowing the sleeve to cool and form a desired interference fit with the pipe. This type of sleeve assembly and repair process is described in more detail in applicant's U.S. Pat. No. 9,982,829 and CA patent 2,891,701. The heater 40 remains operationally positioned on the sleeve at least throughout the heating process, and then may be removed from the sleeve at any point after heating is done, namely from the point before welding of the connector plates to any time after welding is completed and the sleeve is left to cool. Thus operators of the present heater are advantageously afforded a wide latitude as to timing of removal of the heater from the sleeve, without the heater obstructing access to key areas of the sleeve and avoiding interference with the sleeve assembly process, which should become more apparent below.

Figure 2:
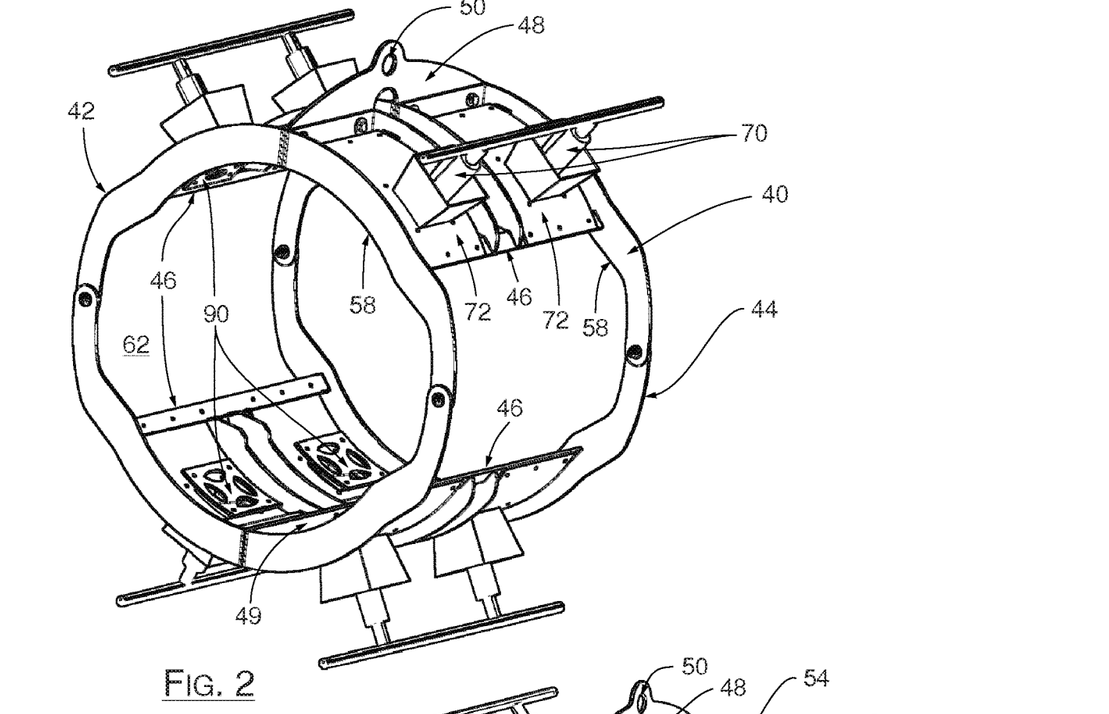
FIG. 2 shows the heater of FIG. 1 in isolation, in a closed configuration.
Figure 3:
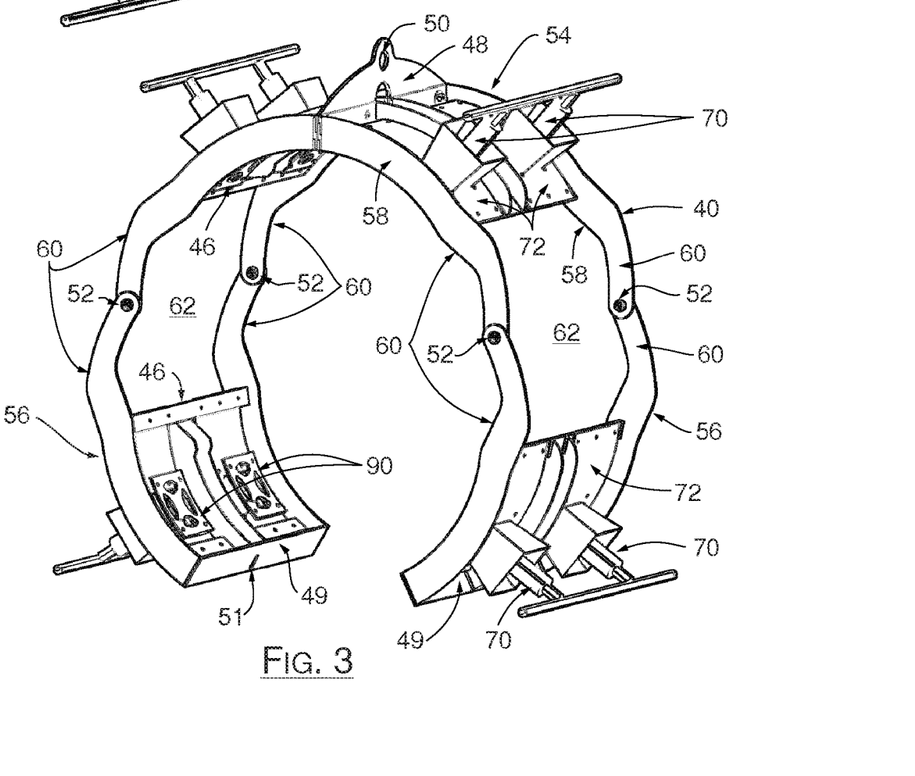
FIG. 3 shows the heater of FIG. 2, but in an open configuration as when moving the heater into or out of operational position on the sleeve and pipe.
Figure 4:
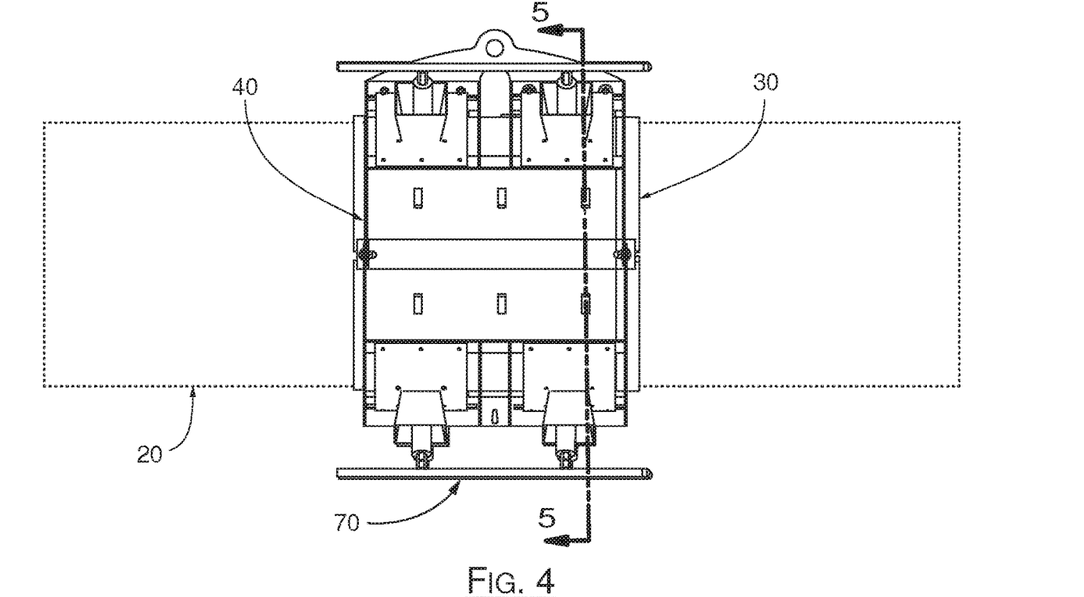
FIG. 4 is a side view of the heater when in operational position in FIG. 1.
Figure 5:
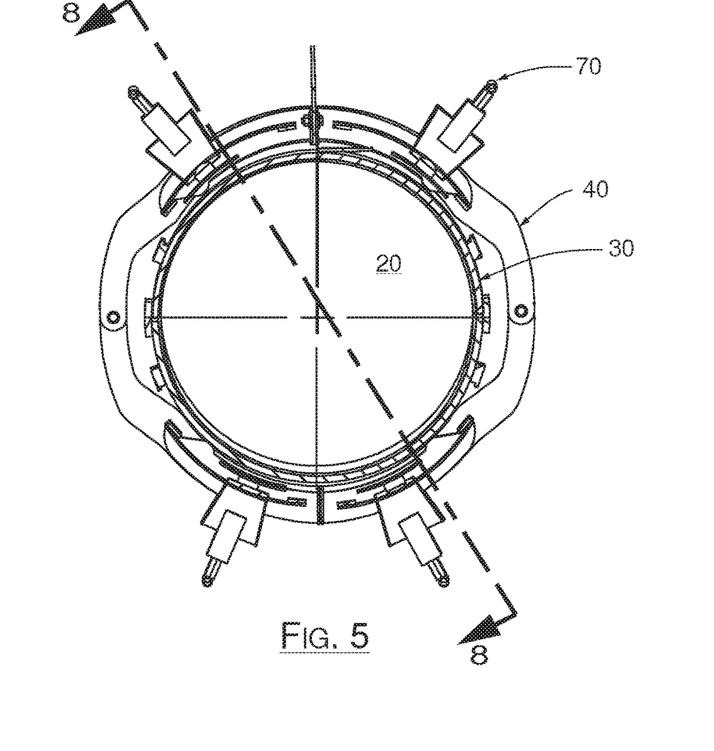
FIG. 5 is a cross-sectional view along the line 5-5 of FIG. 4.
Figures 6, 7:
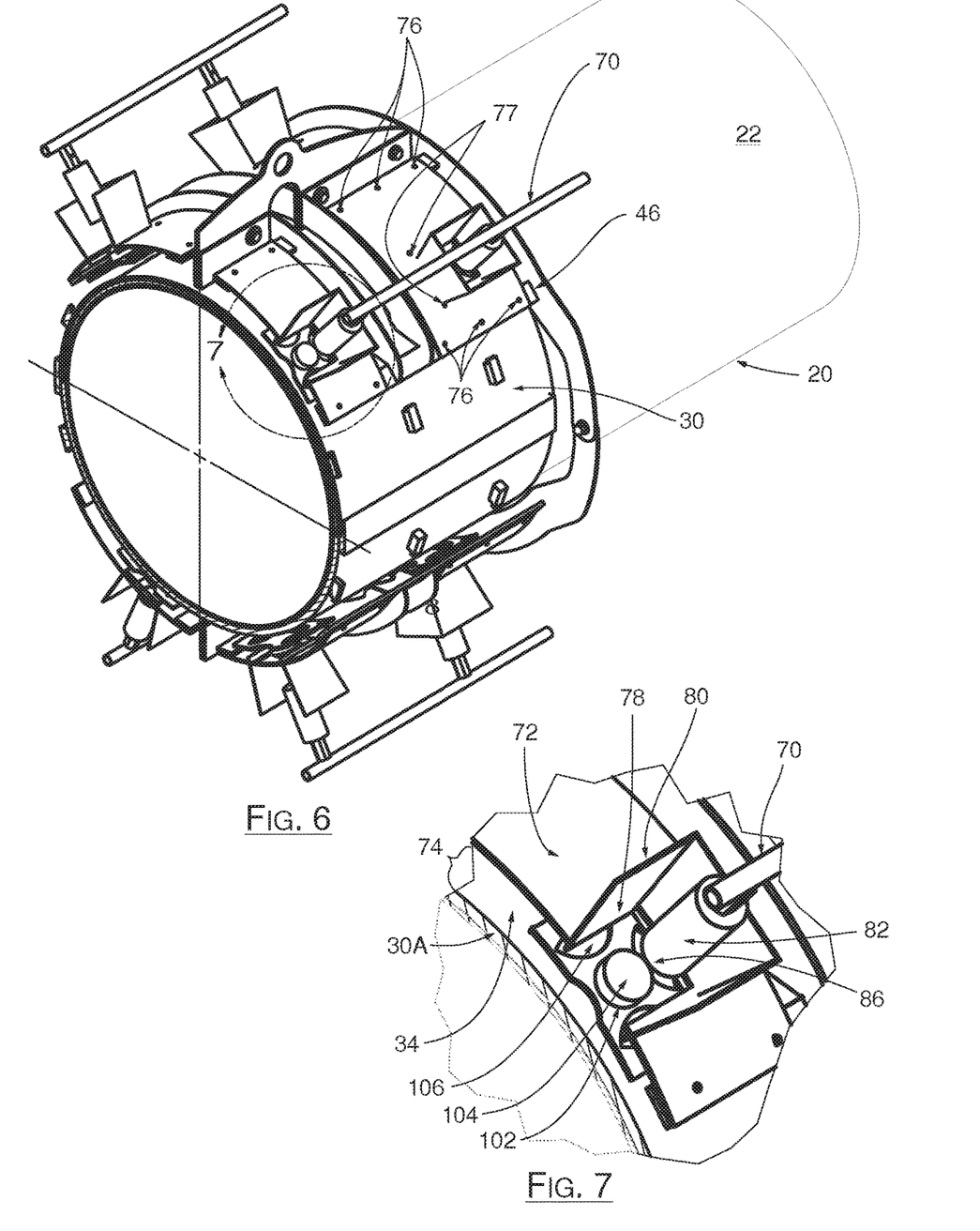
FIG. 6 is a perspective view of the pipe sleeve heater of FIG. 5 in a closed configuration and operationally positioned over the sleeve and pipe.
FIG. 7 is a detailed view of the circled portion in FIG. 6 identified by reference numeral 7, showing a burner in isolation and in a partially cut-away perspective from above.

Referring also to FIGS. 2 and 3, the heater 40 has a drum-shaped frame formed by two transversely spaced collars 42, 44 aligned generally in parallel and interconnected by a plurality of longitudinally extending strap members 46 typically welded at their ends to the collars. A top strap 48 has additional plating with an aperture 50 therethrough for hooking to a crane or like lifting mechanism to hoist and move the heater as needed, such as into operational position onto the pipe and removal afterwards. The collars and straps therefore define a structure having an open truss-like configuration with multiple spaces for operational access to the sleeve when circumferentially encompassed by the heater frame.

The heater frame is divided into two "halves" at the collar hinges 52, namely an upper head portion 54 with pivotally opposed lower jaw portions 56 that can be swung about the hinges 52 between an open configuration, as in FIG. 3 for moving the heater onto or off of the pipe, and a closed configuration, as in FIG. 2 for closing, or enveloping, the frame around the sleeve and pipe, or for storage when not in use. A pair of abuttable bottom frame straps 49 each have apertures 51 which align when the lower jaw portions are closed (as at FIG. 2) to receive a lock member for securing the frame closed, when in operational position clamped about the sleeve or for transport or storage for instance. It will be appreciated that the frame may be provided with alternate hinge configurations for opening and closing into and out of operational position. For instance, the two pairs of opposed hinges 52 in the illustrated embodiment might be replaced with a single pair of hinges located at the frame's apex on either side of the frame's top strap 48. Although this would advantageously reduce the number of "moving parts"

for the heater's frame, it might make it more difficult for operators to swing the resulting larger and heavier jaws away from the pipe when moving the heater into and out of operational position. Alternately, more sets of hinges could be added about the frame circumference, but might not be preferred by making the frame overly "flexible" and unruly for operators to handle.

Each frame collar 42, 44 has a like inner peripheral edge 58 shaped to reflect the curved profile of the sleeve's outer surface 34, so that the heater frame can rest snuggly on the tubular shaped sleeve when closed over it, namely when the heater is operationally positioned. Each collar 42, 44 also has an outwardly bowed portion 60 on either side of each hinge 52 to avoid contact with the sleeve's connector plates 36 and avoid interference with welding of these plates onto the sleeve segments after heating thereof. For this reason an area of open space 62 is ideally maintained between the outwardly bowed portions 60 of the frame, to provide workers with unimpeded access to the sleeve's clamping mechanism and to the connector plates 36, when operationally positioned.

A plurality of plates 72 are located in a spaced relationship about the circumference of the heater frame, functioning as base platforms of individual burner assemblies 70, or "burners". Referring as well to FIGS. 4 to 11, the plates 72 are grouped in longitudinally aligned pairs between the spaced collars 42, 44, and there are four pairs spaced circumferentially about the heater frame. Two pairs of plates are mounted to the frame's upper head portion 54, on either side of the top strap 48, and one pair is mounted to each of the movable lower jaw portions 56, adjacent the bottom straps 49, resulting in a total of eight burners 70 employed for the present heater. It will be appreciated that the number and configuration of these plates 72, and hence burners 70, will depend on several factors, including diameter of pipe being repaired, the length of sleeve for repair, the heat output of each burner, and the like. It is possible to have burner groupings where pairs of burners are replaced by single burners for short sleeves (and so a total of 4 circumferentially spaced burners for such alternate version of heater), and three or more burners longitudinally aligned for particularly long sleeves (for a total of 12 burners). Likewise fewer than the illustrated four burner pairs could be circumferentially located for smaller diameter pipes, or increased in number for unusually large diameter pipes (e.g. 16 grouped burners are used for installing sleeves on pipes with diameters from 42 to 48 inches (about 106 to 122 cm)). The embodiment illustrated herein, of four groups of paired burners distributed about the frame at pre-set spacings as shown, has been found to provide an acceptably even heating, at a desired heat intensity and dispersal, substantially over the entirety of the sleeve for many typical pipeline repair scenarios, particularly for pipes from 30 to 36 inches (about 76 to 92 cm).

Each platform 72 is bowed in the preferred embodiment to generally follow the curvature of the heater's collars 42, 44, and hence of the sleeve and pipe being repaired. The plates 72 are each connected to the heater frame so as to be radially spaced away from the sleeve when the frame is operationally positioned thereon, to leave a gap 74 therebetween (best seen in FIGS. 7, 9 & 10). The plates 72 fastened at several points 76 (best seen in FIG. 6) on their periphery to the frame's longitudinal strap members 46 for easy replacement or removal if need be. Each platform has a square-shaped aperture 78 surrounded on all sides by an upstanding enclosure, or shroud 80, extending radially outwardly therefrom. An elongate burner nozzle 82 is centrally suspended within each shroud 80 and connected at its base to a support and fuel source, namely a gas feed line 84 servicing each pair of burners with propane or the like. The flame tip 86 should be spaced above and away from the shroud's aperture 78, and hence radially away from the sleeve's outer surface 34 when the heater is operationally positioned. The shroud 80 therefore functions to direct and funnel the burner's flame and heat radially inwardly toward the aperture 78 and sleeve below.

Figure 12:
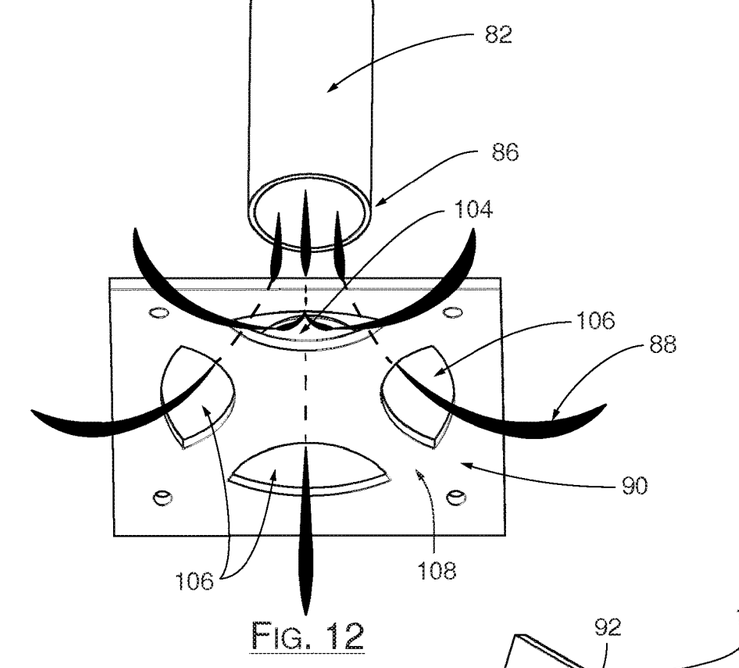
FIG. 12 is a perspective view from below of a baffle shown in isolation from one of the burners of FIG. 11, illustrating how some flame from a burner nozzle is diffused by impacting a deflector of the baffle and is redirected through baffle vents.

An important aspect of the present invention is a baffle member 90 in the form of a bowed plate (shown in isolated detail in FIGS. 12 & 13) located below the burner's nozzle 82 and aperture 78. The baffle is secured beneath the burner platform 72 with spacers via several baffle holes 92 aligned with corresponding platform holes 77 beside the shroud 80. The baffle plate is therefore fixed in a spaced relationship from the burner nozzle, as well as being spaced from the burner platform 72 to leave an upper cavity 94 therebetween, and being spaced from the sleeve's outer surface 34 to leave a lower cavity 96 (best seen in FIGS. 9 & 10). In effect, the baffle plate divides the earlier noted gap 74 (between the platform 72 and the sleeve 30a) into two portions, namely upper and lower cavities 94, 96. The relative sizes of the cavities 94, 96 may be made equal, but may also be advantageously made unequal to vary the proportion of fame and heat travelling above and below the baffle toward the sleeve. The curvature of the bowed baffle plate 90 is preferably complementary to that of the bowed platform plate 72 above, with the aim of maintaining a generally uniform radial spacing therebetween, and thus a fairly uniform upper cavity 94. Whether the lower cavity 96 is uniform or not will largely depend on the contour of the sleeve's outer surface 34, but at least a minimal spacing should be maintained for flame to travel through the lower cavity to heat the sleeve beneath.

Figure 8:
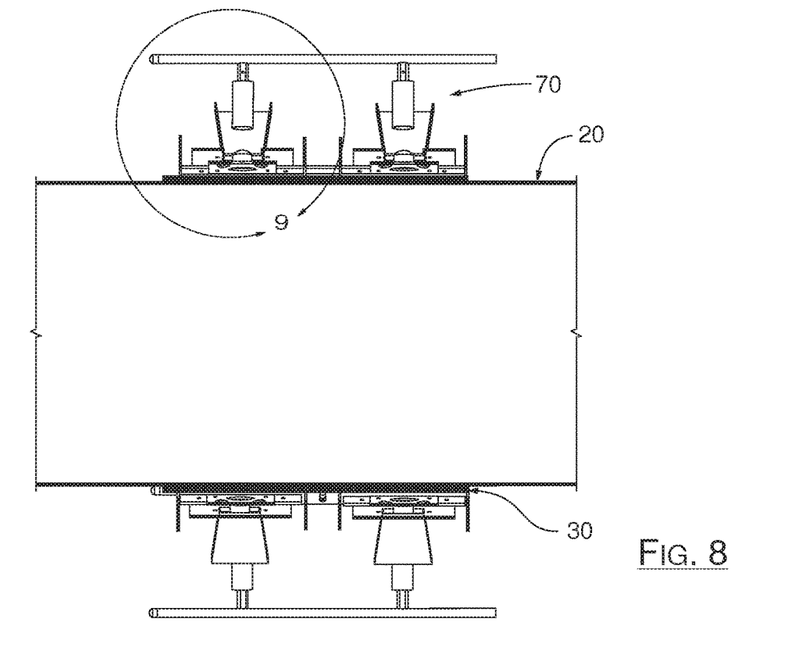
FIG. 8 is a cross-sectional view along the line 8-8 of FIG. 5, showing the heater when operationally positioned over the sleeve and pipe.
Figure 9:
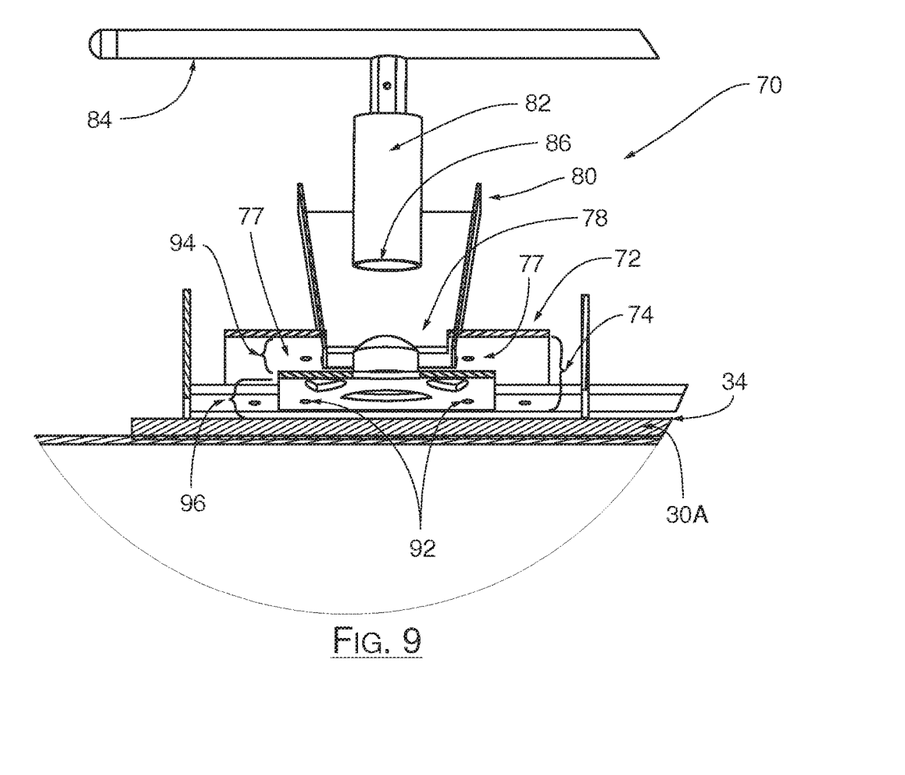
FIG. 9 is a detailed view of the circled portion in FIG. 8 identified by reference numeral 9 showing a burner in isolation and partially cut-away.
Figure 10:
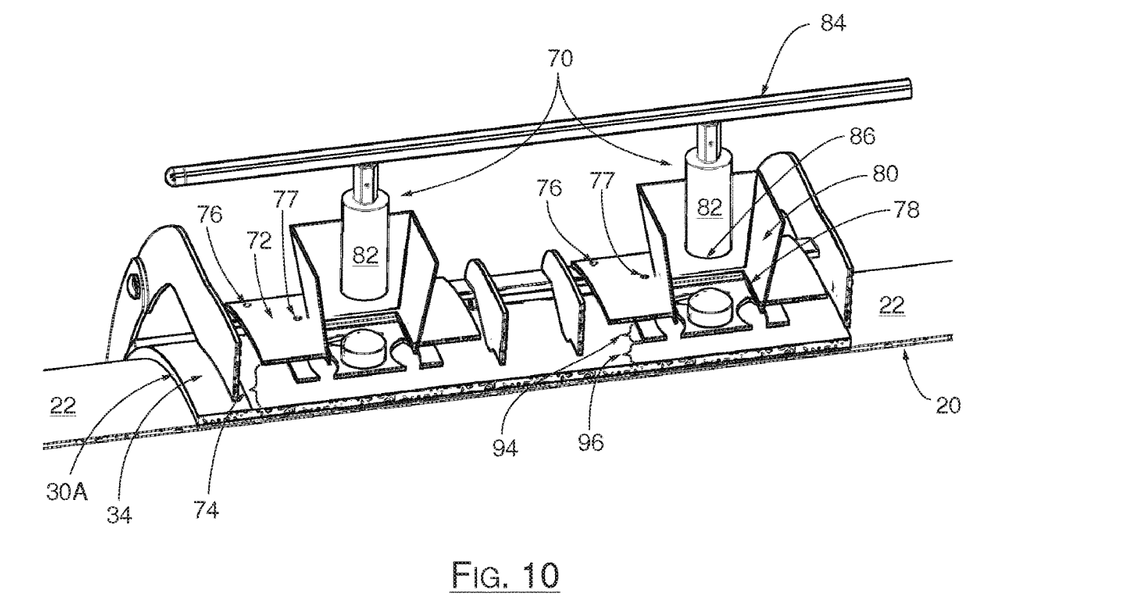
FIG. 10 is a perspective view from above of a group of two longitudinally spaced burners along the top of the pipe in FIG. 8, partially cut-away.
Figure 11:
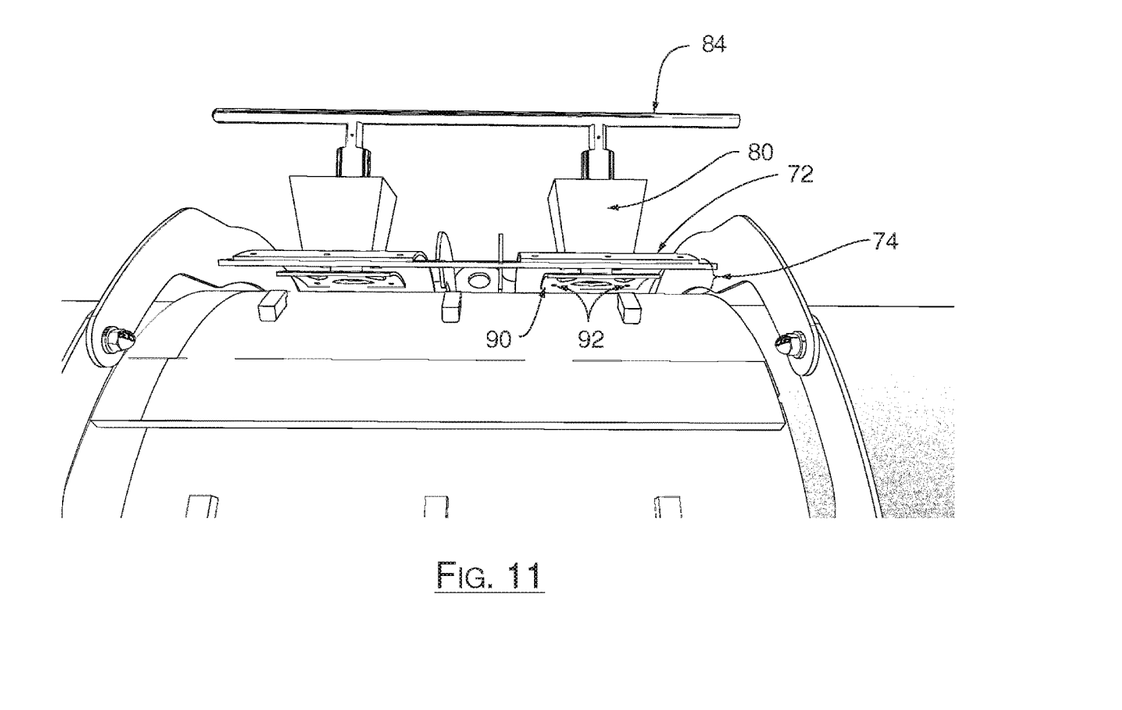
FIG. 11 is a perspective view from below of the group of burners in FIG. 10.
Figure 13:
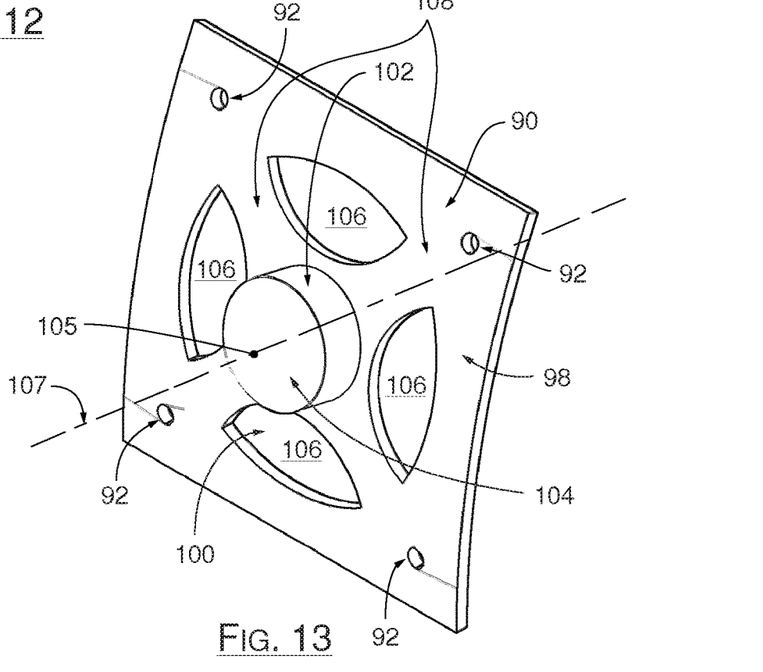
FIG. 13 is a perspective view from above of the opposite side of the baffle of FIG. 12, showing the deflector.

A distinctive feature of the baffle 90 is a deflector 100 protruding perpendicularly upwardly away from a generally central point on the baffle's upper surface 98 (seen best in FIG. 13). The deflector has an upstanding cylindrical base portion 102 capped by a head 104, shown as a smooth spherically-shaped dome in the illustrated embodiment. The height, or length, of the base portion 102 above the upper surface 98 should preferably locate the dome shaped head 104 into the aperture 78 as shown in FIGS. 8 to 10, and the diameter of the base and head should be such as to leave adequate space from the periphery of the aperture 78 to allow flame from the burner to pass therebetween. An arrangement of vents 106 defined by a plurality of oblong slots in the baffle plate 90 are circumferentially arranged about the deflector's base 102 with intermediate ribs 108 to maintain the baffle plate's structural integrity. The vents are sized to allow an adequate quantity of flame to pass therethrough and under the baffle plate through the lower cavity 96 for a desired rate of heating of the sleeve therebelow, and to concurrently provide the noted structural integrity under operating conditions as well as to allow some flame to deflect and travel over the baffle plate and past its periphery. In the preferred embodiment four oblong vents 106 are suitably spaced, or staggered, substantially equidistantly about the deflector to provide the desired heating effect on the sleeve, but it will be appreciated that other vent opening configurations may also be effective, such as different shaped openings (circular, or square for instance) of different sizes (e.g. smaller, larger or mixed) arranged in different patterns over the baffle plate, to alter flame dispersal attributes. It will be appreciated that as few as one arcuate opening extending circumferentially to substantially encompass the deflector, and employing a single attaching rib 108, should achieve the desired flame distribution and resultant uniform heating, although more ribs may be advantageous to maintain the plate's shape in challenging operational environments.

The burner nozzle 82 is ideally aimed toward a peak 105 of the shaped head 104 and linearly aligned with a longitudinal axis 107 of the deflector so that flame from the burner tip 86 impacts about the head's peak to scatter the flame as uniformly as possible around the deflector to diffuse it over a considerable part of the sleeve's outer surface. The diffusion is achieved when some flame (indicated by 88 in FIG. 12) impacts the deflector and then scatters through the baffle vents 106 and outwardly through the lower cavity 96 to heat an immediate area of the sleeve's surface proximate the baffle plate. Other flame scattered from the deflector also travels above the baffle plate, through the upper cavity 94, to impact and heat a distal area of the sleeve's surface beyond the perimeter of the baffle plate. Some overlap of flame from the noted immediate and distal areas will typically occur beyond the baffle perimeter. It will be appreciated that flame dispersal characteristics, namely its distance, direction and pattern, can be advantageously manipulated by altering one or more deflector features, for instance; by altering sizing of the deflector, such as modifying the height of the defector's base to change the elevation of the domed head to the deflector vents; by adjusting, namely increasing or decreasing, the diameter—i.e. width—of the deflector from that shown in the drawings (where diameter of the head and base are roughly the same as that of the burner nozzle's tip); by changing the shape or geometry of the deflector head from the depicted hemispherical dome, such as to pointed, segmental, catenary or faceted; and/or by aiming the burner nozzle away from the peak of the deflector.

The operation and many advantages of the present invention may now be better appreciated. Upon fitting a pair of sleeve segments 30a, 30b onto a longitudinal section of defective hollow pipe 20 and clamping the segments thereon by securing screw jacks to respective lug nuts 32a, the pipe sleeve heater 40 in its open configuration (FIG. 3) is brought over the clamped sleeve and the lower jaw portions 56 are pivoted to a closed configuration (FIG. 2) and secured thereby placing the heater in an operational position circumferentially encompassing the sleeve and pipe (FIGS. 1 and 4 to 6). Once operationally positioned, the heater's gas feed lines are connected to a managed energy source, most typically one or more commercial propane tanks with appropriate controls. The eight burners (four on top and four on the bottom in the preferred embodiment) may then be activated to create the desired diffused flame dispersal (FIG. 12) and thus enhanced heating contact over the sleeve to achieve a targeted heating profile for the sleeve, such as that for thick sleeves previously described with reference to applicant's earlier noted patents. This enhanced and more uniform heating of the sleeve, which has been long sought but difficult to attain, is now conveniently possible by employing the present heat with novel baffles 90 intermediate the burner nozzles 82 and the sleeve's outer surface 34.

Once the heating has reached a given target, the operator has the choice of either: 1) removing the heater immediately from the sleeve and pipe, following the reverse of the above-noted steps for operational positioning, and then completing the tasks for fixing the hot sleeve to the pipe, such as by welding the connector plates 36 to the sleeve segments 30a, 30b; or 2) delaying removal of the heater and immediately welding the connector plates to the sleeve segments, by accessing the connector plates via the open areas 62 of the heater frame, and then removing the heater after completing the tasks for fixing the sleeve to the pipe. This opportunity to proceed with either option 1 or 2 is particularly advantageous in northern and colder climates where immediate attention to welding of the connector plates while the sleeve segments are at optimal temperatures provides improved results over having to delay welding while the sleeve temperature drops as heating equipment is moved out of the way before gaining proper access to the connector plates. Option 2 is most attractive since the heater is left on the sleeve and the burners are advantageously left burning at a lower setting to keep the sleeve at a target temperature (although some or all can also be shut-off if desired), and welding of the connector plates can commence without delay, to avoid unwanted cooling of the sleeve or unwanted heating of the underlying pipe. After two or three welding passes on the connector plates, the heater can be shut-off and removed.

Another advantage of the present heater is the improved safety and reduction of required labour for heating a given sleeve. The heater 40 can be operated by a single operator, at a good distance from the rather significant heat and flame produced by eight burners simultaneously. In contrast, prior sleeve heating methods required multiple workers operating hand-held propane torches while standing beside a clamped sleeve, running the risk of burns and other injury.

The following numerous important advantages of the present invention have been identified:

a) The novel baffle design and positioning improves heat dispersal over a larger area of the sleeve and improved rate of uniform heating minimizes or avoids "point heating" problems on a sleeve beneath a heating nozzle. Point heating is undesired because a small area of a sleeve impacted by direct flame heats rapidly and excessively relative to a vast portion of sleeve outside the small point heated area which remains relatively cool, making sleeve installation difficult, faulty or impossible.

b) The novel baffle design and positioning avoids "cold spot" problems on a sleeve beneath a heating nozzle. Applicant found that attempts to employ a common solid metal plate lacking the novel features of the present baffle led to cold spot formation on the sleeve beneath the solid plate, which in effect is the reverse of the "point heating" problem, as the cold spot area takes too long to reach a target temperature while the surrounding sleeve is heated excessively, thus making sleeve installation difficult, faulty or impossible.

c) The diffused flame resulting from the novel baffle design allows more flame contact onto the sleeve surface, transferring more heat per time to the sleeve than prior art arrangements or methods. This accelerated heat transfer results in an improved temperature profile across the sleeve-pipe thickness, namely a desired temperature differential between sleeve and pipe where the sleeve surface heats quickly while heating of the pipe's internal surface lags to remain relatively cool, so that the sleeve expands more rapidly relative to the pipe and such expansion is captured by welding of the sleeve connector plates before the sleeve cools and contracts to provide the desired compression fit on the pipe.

d) The aforementioned accelerated heat transfer capability afforded by the present invention allows installation of sleeves on thinner pipes having higher internal pressures than with prior art methods. Further, pipeline operating pressure at the repair site need not be reduced as was necessary with the prior art, which avoids expensive loss of through-put for pipeline operators, and as a result also omits venting of greenhouse gas pollutants to atmosphere such as methane gas.

e) The improved heat transfer of the present invention provides the option of using smaller sized and capacity heating nozzles, as well as more efficient use of fuel, typically propane, than previous arrangements.

f) The present invention's avoidance of the above-noted excessive heating of the sleeve in prior art arrangements reduces the risk of over-heating and damaging the epoxy placed between sleeve and pipe during the repair process.

Figure 14:
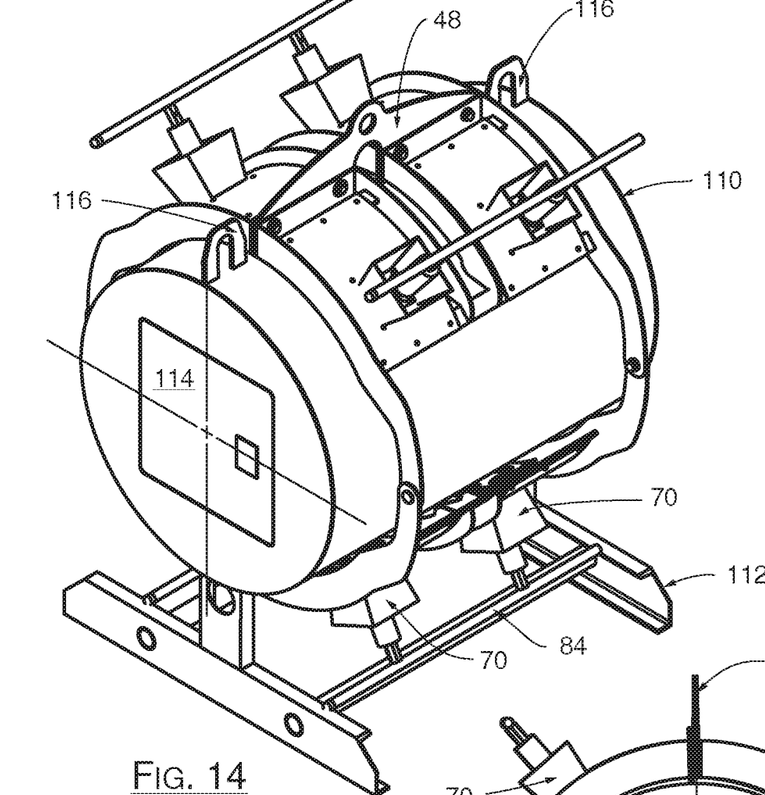
FIG. 14 is a perspective view of the heater of FIG. 1 secured about a transport module capable of storing pipe repair equipment, and having a skid portion for stable placement on a support surface.
Figure 15:
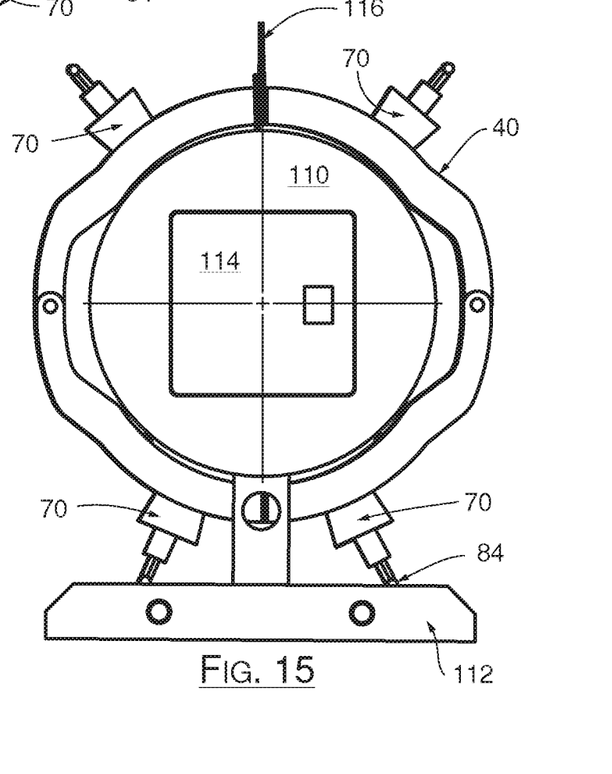
FIG. 15 is an end view from the left side of FIG. 14.

Yet another particularly advantageous aspect of the present heater is depicted in FIGS. 14 and 15 showing a transportation mode where the heater 40 is mounted snugly about a tubular module 110, in a closed and secured configuration, ready for storage or for transport to a pipeline work site. The module has a skid portion 112 for stable above-ground support. The skid provides sufficient elevation to the heater so that the bottom burners 70 and the corresponding gas feed lines 84 are kept off the ground while stored or during transport, significantly reducing the risk of damage and down-time cost due to repair. The module has a locking entry door 114 accessing an internal compartment for safe and convenient storage of necessary worksite tools and equipment, resulting in a smart use of otherwise wasted space. Hook eyelets 116 on both ends of the module allow for lifting and manipulation of the entire arrangement, avoiding the need to grip the heater directly and risk further damage thereto during transfer.

The above description is intended in an illustrative rather than a restrictive sense, and variations to the specific configurations described may be apparent to skilled persons in adapting the present invention to other specific applications. Further, the scope of the claims below should not be limited by the preferred embodiment set forth herein, but should be given the broadest interpretation consistent with the above description as a whole.

The invention claimed is:

1. An apparatus to heat a tubular repair sleeve mounted on a longitudinal section of defective hollow pipe comprising:
   a frame adapted to fit onto said sleeve and be closed into an operational position circumferentially encompassing said sleeve;
   a plurality of burners on said frame at intervals circumferentially thereabout when in said operational position, each burner having:
   a) a heating nozzle spaced radially from said sleeve when in said operational position; and,
   b) a baffle located intermediate said heating nozzle and said sleeve when in said operational position, each baffle defined by a plate having:
      i) a vent arrangement spaced away from a given point on said baffle plate and extending thereabout to allow flame from said heating nozzle to travel through said vent arrangement into contact with said sleeve; and,
      ii) a deflector proximate said given point intermediate said vent arrangement and facing said heating nozzle for impacting and redirecting said flame therefrom toward said vent arrangement and periphery of said baffle plate, thereby providing substantially diffused flame for enhanced heating of said sleeve about each burner when in said operational position.

2. The apparatus of claim 1 wherein said deflector includes a shaped head portion, and said heating nozzle is directed toward a peak of said shaped head portion.

3. The apparatus of claim 2 wherein said heating nozzle is further linearly aligned with an axis of said defector.

4. The apparatus of claim 2 wherein each burner further includes a shroud surrounding said heating nozzle for channeling said flame toward said deflector and baffle.

5. The apparatus of claim 1 wherein the shape of said deflector is selected from a group consisting of domed, pointed, hemispherical, segmental, catenary and faceted.

6. The apparatus of claim 1 wherein said deflector comprises a shaped head portion atop a cylindrical base portion, said base portion being sized to elevate said head portion a preset distance from said baffle plate for desired flame dispersal thereover.

7. The apparatus of claim 6 wherein said heating nozzle has a pre-set diameter, and the diameter of said head and base portions ranges from smaller to larger than said pre-set diameter.

8. The apparatus of claim 1 wherein said baffle plate is generally perpendicularly aligned to said heating nozzle.

9. The apparatus of claim 8 wherein said baffle plate is bowed shaped away from said heating nozzle.

10. The apparatus of claim 9 wherein said bow shape generally complements the tubular shape of said sleeve for maintaining a generally even spacing therebetween.

11. The apparatus of claim 1 wherein said vent arrangement comprises at least one opening extending circumferentially about said given point to allow for substantially uniform distribution of flame intermediate said baffle plate and said sleeve.

12. The apparatus of claim 1 wherein said plurality of burners are formed by an arrangement of burner groupings, each burner grouping comprising one or more of said burners, said burner groupings being circumferentially distributed about said frame at pre-set spacing to provide substantially even heating of said sleeve.

13. The apparatus of claim 12 wherein each of said burner groupings comprises longitudinally aligned pairs of said burners sharing a common source of fuel.

14. The apparatus of claim 1 wherein said frame comprises a head portion and jaw portions pivotally connected thereto, said jaw portions being operable between an open configuration for moving said frame onto and off of said sleeve, and a closed configuration for securing said frame on said sleeve in said operational position.

15. The apparatus of claim 1 further including a module for securely storing and transporting pipe repair equipment wherein said frame fits onto and is secured to said module for transport therewith.

16. The apparatus of claim 15 wherein said module includes a skid portion for stable support of said module and frame upon a support surface, and hook members on said module for lifting said module and frame without engaging said frame to avoid damage thereto.

\* \* \* \* \*